United States Patent [19]

Tajima et al.

[11] Patent Number: 5,764,051
[45] Date of Patent: Jun. 9, 1998

[54] COLD FORGED TOOTHED RING FOR PRODUCING ROTATIONAL SPEED SIGNALS

[75] Inventors: Eiji Tajima, Iwata-gun; Michio Iihara, Hamamatsu; Osamu Shimizu; Akira Sera, both of Iwata, all of Japan

[73] Assignee: NTN Corporation, Osaka, Japan

[21] Appl. No.: 856,195

[22] Filed: May 14, 1997

Related U.S. Application Data

[63] Continuation of Ser. No. 520,875, Aug. 30, 1995, abandoned, which is a continuation-in-part of Ser. No. 219,299, Mar. 28, 1994, Pat. No. 5,544,548.

[30] Foreign Application Priority Data

Aug. 31, 1993 [JP] Japan ................................. 5-240657
Nov. 30, 1993 [JP] Japan ................................. 5-329894
Aug. 30, 1994 [JP] Japan ................................. 6-230479

[51] Int. Cl.$^6$ ............................... G01B 7/14; G01P 3/00; G01P 3/488; G01D 5/244
[52] U.S. Cl. ................................. 324/207.22; 324/173
[58] Field of Search ............................ 324/173, 174, 324/207.11, 207.22, 207.25; 310/68.3, 155, 168

[56] References Cited

U.S. PATENT DOCUMENTS

| | | |
|---|---|---|
| 4,509,353 | 4/1985 | Ike et al. . |
| 4,546,635 | 10/1985 | Arita et al. . |
| 4,647,802 | 3/1987 | Konecny ................................. 310/168 |
| 4,653,305 | 3/1987 | Kanamaru et al. . |
| 4,924,690 | 5/1990 | Kanamaru et al. . |

FOREIGN PATENT DOCUMENTS

| | | |
|---|---|---|
| 0 163 769 | 12/1985 | European Pat. Off. . |
| 0 188 668 | 7/1986 | European Pat. Off. . |
| 0 322 770 | 7/1989 | European Pat. Off. . |
| 0 356 118 | 2/1990 | European Pat. Off. . |
| 4-52042 | 2/1992 | Japan . |
| 2 237 391 | 5/1991 | United Kingdom . |

*Primary Examiner*—Walter E. Snow

[57] ABSTRACT

A cold forged pulsar ring (1) which comprises a ring body (1a) having inner and outer peripheral surfaces. A plurality of circumferentially spaced gear teeth (2) are integrally formed by the use of a cold forging process with one of the inner and outer peripheral surfaces of the ring body (1a) so as to protrude radially of the ring body (1a). Each of the gear teeth (2) is so profiled as to have a substantially trapezoidal shape having a tooth angle (θ) not smaller than 5°, but not greater than 15°. With this design, not only can a cold forging process be employed to manufacture the pulsar ring (1), but also a required output voltage can be secured from a sensor of the rotation detecting device in which the pulsar ring (1) is operatively employed.

20 Claims, 4 Drawing Sheets

COLD FORGED TOOTHED RING FOR PRODUCING ROTATIONAL SPEED SIGNALS

CROSS-REFERENCE TO THE RELATED APPLICATIONS

This application is a continuation of application Ser. No. 08/520,875, filed Aug. 30, 1995, now abandoned, which was a continuation-in-part of application Ser. No. 08/219,299, filed Mar. 28, 1994, now U.S. Pat. No. 5,544,548.

BACKGROUND OF THE INVENTION

1. (Field of the Invention)

The present invention relates to a cold forged toothed ring rotor, or "pulsar ring," adapted to be used in a rotation detecting device for detecting revolving speed of a wheel in an automobile anti-lock brake system (ABS).

2. (Description of the Prior Art)

The pulsar ring of the kind referred to above is in the form of a ring gear having a plurality of gear teeth adapted to be detected by an electromagnetic induction sensor during the rotation of such ring gear so that the electromagnetic induction sensor can provide a pulse output indicative of the speed of rotation of the ring gear. The prior art pulsar ring is generally formed by sintering or milling and, as shown in FIG. 5A, the gear teeth of the prior art pulsar ring is of a shape having a pair of steeply inclined opposite tooth faces protruding radially outwardly from the ring body.

Since the use of either the sintering technique or the milling technique to manufacture the prior art pulsar ring involves an increased manufacturing cost, an inexpensive method has been longed for. The applicant of the present application has suggested the inexpensive method for the manufacture of the pulsar ring such as disclosed in, for example, aforementioned U.S. Pat. No. 5,544,548. According to the method disclosed in such U.S. Patent, material for the pulsar ring is pressed into dies to facilitate formation of gear teeth.

Where the gear teeth are formed by the use of such a cold forging technique, generally it has been difficult to form each gear tooth to have such a steeply inclined shape as shown in FIG. 5A and each gear tooth is likely to be shaped to have a pair of moderately inclined opposite tooth faces such as shown in FIG. 5B.

It has, however, been found that, when the gear teeth of the pulsar ring are of such a shape as shown in FIG. 5B, the pulsar ring would no longer be used in practice because the electromagnetic induction sensor tends to output a decreased voltage to such an extent that no stable detection of wheel rotation is possible. By way of example, the output voltage from the sensor is of such a waveform as shown by a curve a or a curve b in FIG. 6A depending on the number of revolutions of the pulsar ring. The output voltage is low when the number of revolutions of the pulsar ring is small.

This output voltage from the sensor is processed by a predetermined threshold level SL to eliminate any possible influence brought about by noises and is then shaped as to be converted into a rectangular waveform as shown in FIG. 6B. Accordingly, when the pulsar ring is rotated at a low speed, no detection of the rotational speed is possible because of the threshold level SL. Therefore, if the gear teeth of the pulsar ring are made to be of a profile having moderately inclined tooth faces, and where the output voltage from the sensor is lowered consequent upon the gear teeth of the pulsar ring being so shaped, a minimum possible speed of rotation of the pulsar ring at which detection of the rotational speed can be accomplished satisfactorily tends to be increased.

SUMMARY OF THE INVENTION

Accordingly, the present invention has been devised to provide a pulsar ring which can be cold forged and which effectively provides a sufficiently required output voltage.

To this end, the improved cold forged pulsar ring according to the present invention comprises a ring body having inner and outer peripheral surfaces. A plurality of circumferentially spaced gear teeth are integrally formed by the use of a cold forging process at one of the inner and outer peripheral surfaces of the ring body so as to protrude radially of the ring body. Each of the gear teeth is so profiled as to have a substantially trapezoidal shape having a tooth angle not smaller than 5°, but not greater than 15°.

In general, the pulsar ring is such that a relatively high output voltage can be obtained from the sensor as the tooth angle $\theta$ decreases. However, if the tooth angle $\theta$ is smaller than 5°, the cold forging would be almost impossible to accomplish. Also, if the tooth angle $\theta$ exceeds 15°, the output voltage from the sensor would be lowered considerably.

Therefore, in the practice of the present invention, the tooth angle of each gear teeth of the cold forged pulsar ring is chosen to be within the range of 5° to 15°, it is possible not only to accomplish the manufacture of the pulsar ring by the use of the cold forging process, but also to secure the required output voltage from the sensor.

Preferably, the tooth angle referred to above is not smaller than 7°, but not greater than 15° and, more preferably, not smaller than 8°, but not greater than 14°.

Also, each of the gear teeth has a tooth height which is preferably not smaller than 1 mm, but not greater than 3 mm.

In addition, each of the gear teeth has a tooth thickness which is preferably not smaller than 1 mm, but not greater than 2 mm.

With this design according to the present invention, not only can a cold forging process be employed to manufacture the pulsar ring, but also a required output voltage can be secured from a sensor.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1:
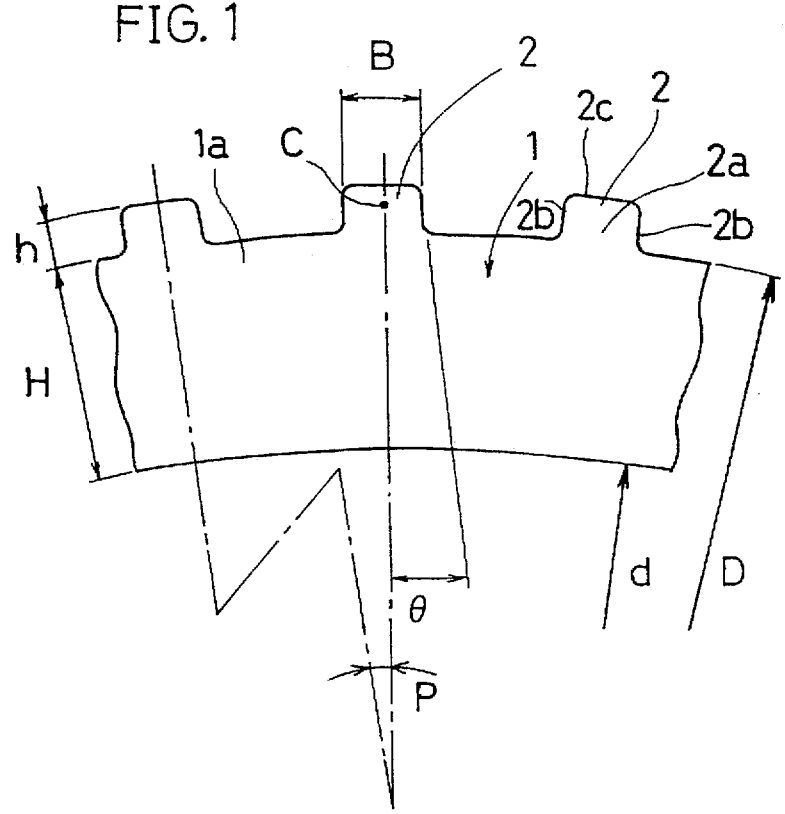
FIG. 1 is a fragmentary front elevational view of a pulsar ring according to a first preferred embodiment of the present invention.

A first preferred embodiment of the present invention will now be described with particular reference to FIGS. 1 to 3. A pulsar ring 1 according to the present invention comprises a ring body 1a having its outer peripheral surface formed with a plurality of gear teeth 2 protruding radially outwardly therefrom and spaced equally from each other at a predetermined pitch in a circumferential direction thereof. These gear teeth 2 integral with the ring body 1 are formed by cold forging a material for the pulsar ring 1 so that each gear tooth 2 can present a generally trapezoidal shape of particular dimensions which will now be described. Specifically, each tooth 2 has a base 2a integral with the ring body 1a, opposing gear faces 2b protruding an equal length radially outwardly from the outer peripheral surface of the ring body 1a, and a substantially flat crest 2c and is so profiled and so dimensioned in the illustrated embodiment that the respective gear tooth 2 may have a tooth angle θ not smaller than 5°, but not greater than 15°; a tooth height h not smaller than 1 mm, but not greater than 3 mm; and a tooth thickness B not smaller than 1 mm and not greater than 2 mm.

The tooth angle θ referred to above is defined as the angle of inclination of each tooth face 2b as measured in a direction radially inwardly of the ring body 1 relative to the imaginary line drawn so as to pass the center of the ring body 2 (the axis of rotation of the pulsar ring 1) and also a point intermediate of the tooth thickness B. The tooth thickness B of each gear tooth 2 referred to above is measured in a direction circumferentially of the pulsar ring 1 along an imaginary circle passing through a point C intermediate of the tooth height h. According to the present invention, the ratio h/H of the tooth height h relative to the ring width H of the ring body 2 as measured between the outer and inner peripheral surfaces of the ring body 2 in the radial direction is chosen to be within a specific range to which the cold forging can be exercised, that is, not smaller than 1:5, but not greater than 1:1. Material for the pulsar ring 1 may be either soft steel or stainless steel. Where the soft steel is chosen as material for the pulsar ring 1, a surface treatment or a surface plating is carried out for rust prevention.

The tooth angle θ is preferably not smaller than 7°, but not greater than 15° and, more preferably, not smaller than 8°, but not greater than 14°. The tooth height h is preferably not smaller than 2 mm, but not greater than 3 mm. The tooth thickness B is preferably not smaller than 1.0 mm, but not greater than 1.5 mm. A preferred combination of the tooth angle θ, the tooth height h and the tooth thickness B is such that the tooth angle θ is within the range of 7° to 15°, the tooth height h is within the range of 2 to 3 mm and the tooth thickness B is within the range of 1.0 to 1.5 mm.

Figure 2:
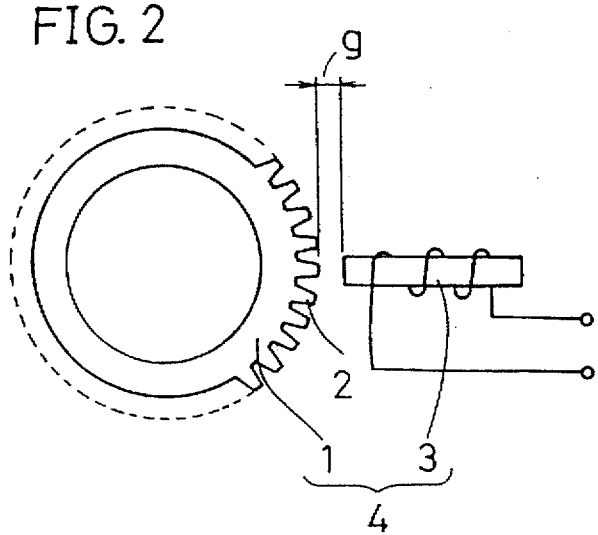
FIG. 2 is a diagram schematically showing a rotation detecting device comprised of the pulsar ring of the present invention and a sensor.

As shown in FIG. 2, the pulsar ring 1 of the present invention is in practice used to form a rotation detecting device 4 in combination with an electro-magnetic induction sensor 3 for detecting the gear teeth 2.

Figure 3A:
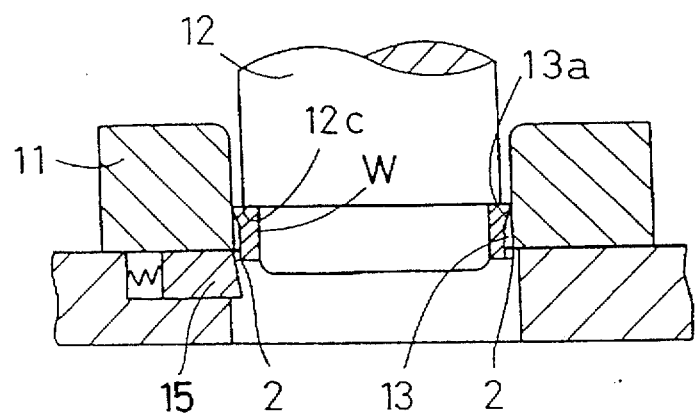
FIGS. 3A and 3B are schematic side sectional views showing the sequence of manufacture of the pulsar ring with a punch held in different operating conditions, respectively.
Figure 3B:
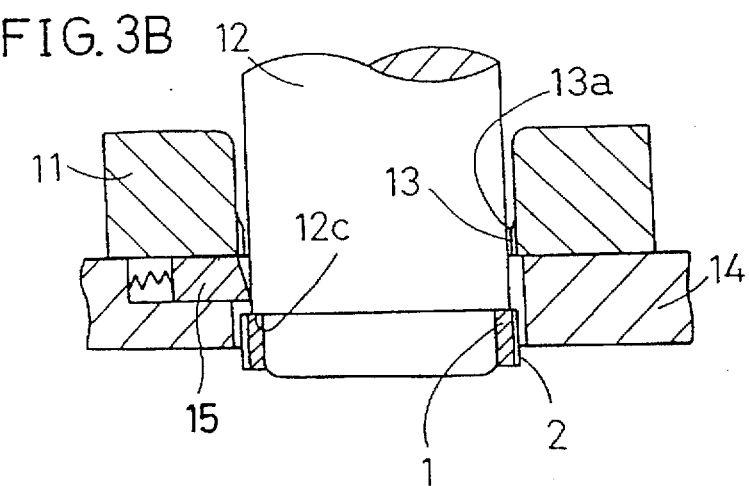

FIG. 3 comprised of FIGS. 3A and 3B illustrates the sequence of manufacture of the pulsar ring 1 by means of a cold forging process. According to this cold forging process, a ring-shaped die 11 and a generally shaft-like, stepped punch 12 are employed and cooperate with each other to forge a ring-shaped material W for the pulsar ring 1, which has been placed inside a shaped cavity in the die 11, by means of an annular step 12c of the punch 12. The ring-shaped material W for the pulsar ring 1 may be a slice of a tubular or pipe-like metallic member or the like. By so forging, the ring-shaped material W is plasticized with an outer peripheral portion of the material W consequently recessed inwardly by a plurality of tooth defining protrusions 13, formed on an inner peripheral surface of the die 11 in a gear-like pattern, and is subsequently discharged, as shown in FIG. 3B, out from the die 11 to thereby complete the pulsar ring having the gear teeth 2 which are a replica of the pattern of the tooth defining protrusions 13. It is to be noted that an upper end portion 13a of each of radially inwardly tooth defining protrusions 13 in the die 11 is inclined to converge radially inwardly so as to facilitate guidance of the ring-shaped material W as the latter is forged into the shaped cavity in the die 11 by means of the punch 12.

After the ring-shaped material W has been forged in the manner described above, the punch 12 is lifted to depart from the die 11, permitting the resultant pulsar ring 1 to be separated from the punch 12 while caught by a stopper pawl 15 mounted on a die holder 14.

With this pulsar ring 1 so formed, the gear teeth 2 are shaped to have the required profile and, accordingly, not only can the electromagnetic induction sensor of the rotation detecting device utilizing this pulsar ring 1 provide a required output voltage, but also the cold forging process to make this pulsar ring 1 can be accomplished with no difficulty. In other words, although a relatively high output voltage can be obtained from the sensor as the tooth angle θ decreases, the cold forging would be almost impossible to accomplish if the tooth angle θ is smaller than 5°. Also, if the tooth angle θ exceeds 15°, the output voltage from the sensor would be lowered considerably. Accordingly, the selection of the range of 5° to 15° for the tooth angle θ makes it possible to accomplish the cold forging process and also to secure the required output voltage from the sensor.

With respect to the tooth height h, a high output voltage can be obtained from the sensor as the tooth height h increases. However, if the tooth height h is not greater than 3 mm, cold forging is possible without difficulty, but if the tooth height h is smaller than 1 mm, the required output voltage cannot be obtained from the sensor. Accordingly, the selection of the range of 1 to 3 mm for the tooth height h makes it possible to accomplish the cold forging process and also to secure the required output voltage from the sensor.

Also, with respect to the tooth thickness B, if it is smaller than 1 mm, cold forging is not possible without difficulty and this is true even when the tooth thickness B exceeds 2 mm. Also, if the tooth thickness B exceeds 2 mm, the output voltage from the sensor would be lowered.

For the reason discussed above, the selection of the tooth angle θ within the range of 5° to 15°, the tooth height h within the range of 1 to 3 mm and the tooth thickness within the range of 1 to 2 mm results in the gear teeth 2 each having an optimum profile sufficient to make it possible to secure the required output voltage from the sensor without accompanying an undue reduction thereof and also to accomplish manufacture of the inexpensive pulsar ring 1 by the use of the cold forging process. The optimum ranges of the tooth angle θ, the tooth height h and the tooth thickness B for the purpose of the invention have been ascertained as a result of experiments conducted by the inventors of the present invention.

It is pointed out that although the tooth height h and the tooth thickness B discussed above may be related to the ring width H, the inner diameter d of the ring body 1a and the pitch angle p subtended by the pitch between the neighboring gear teeth 2, not only can the required output voltage be secured from the sensor, but also the cold forging of the pulsar ring 1a having the above discussed tooth parameters within the above discussed specific ranges is possible, provided that the ring width H is not smaller than 5 mm, but not greater than 20 mm, the inner diameter d of the ring body 1a is not smaller than 50 mm, but not greater than 90 mm and the pitch angle p is not smaller than 2°, but not greater than 4°.

Figure 4:
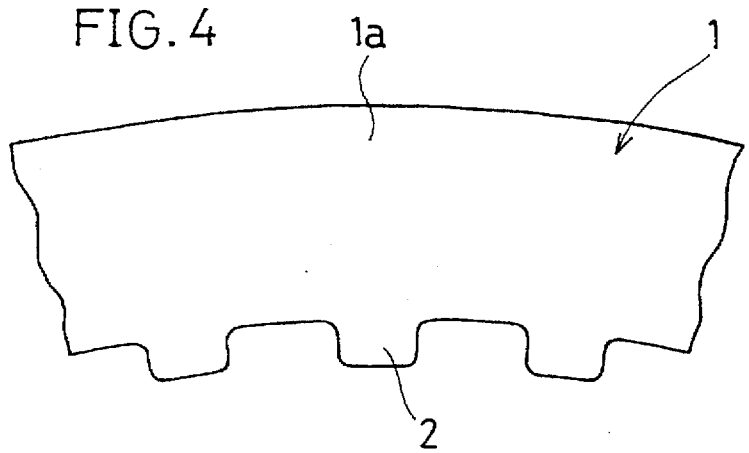
FIG. 4 is a fragmentary front elevational view of the pulsar ring according to a second preferred embodiment of the present invention.
Figure 5A:
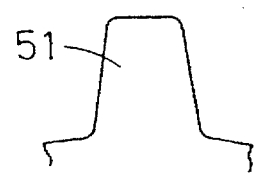
FIG. 5A is fragmentary front elevational views of pulsar rings, showing the shape of a gear tooth in one conventional pulsar ring.
Figure 5B:
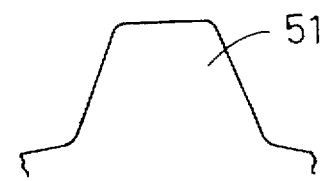
FIG. 5B is a view similar to FIG. 5A, showing the shape of a gear tooth in another conventional form of the pulsar ring of FIG. 5A.
Figure 6A:
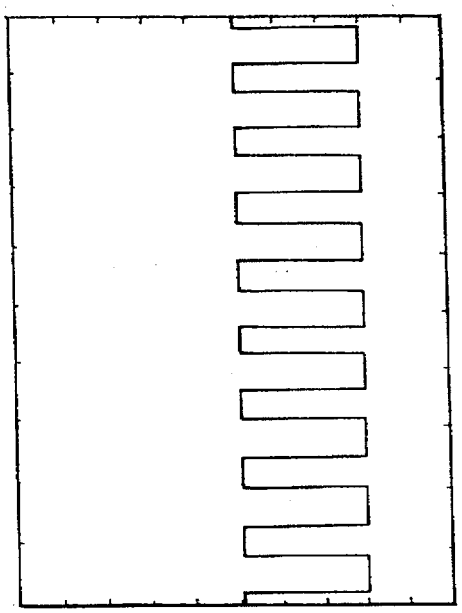
FIG. 6A is a graph showing an output voltage generated from an electromagnetic induction sensor of the rotation detecting device utilizing the pulsar ring.
Figure 6B:
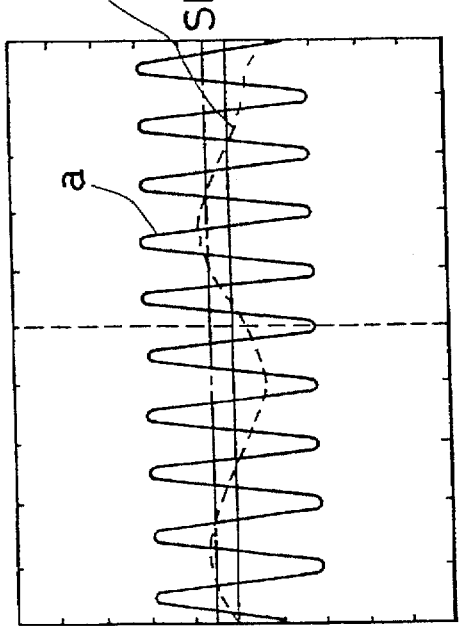
FIG. 6B is a graph showing the output voltage from the sensor which has been processed to have a rectangular waveform.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in describing the preferred embodiment of the present invention reference has been made to the externally tooth-formed pulsar ring 1, the present invention equally applied to an internally tooth-formed pulsar ring 1 such as shown in FIG. 4.

Accordingly, such changes and modifications are, unless they depart from the scope of the present invention as defined in the claims annexed hereto, to be construed as included therein.

What is claimed is:

1. A cold-forged toothed ring rotor for developing rotational speed signals, the rotor comprising:

a ring body having inner and outer peripheral surfaces;

a plurality of circumferentially spaced teeth protruding radially from the outer peripheral surface of the ring body, the teeth being integrally formed with the ring body by the use of a cold forging process, and each of the teeth having a base integral with the ring body, circumferentially opposed tooth faces and a crest opposed to the base; and wherein each tooth is profiled to have a substantially trapezoidal shape in which the angular inclination of the tooth faces with respect to a radius of the ring body extending through the center of the tooth is at least 5° and no more than 15°.

2. The cold-forged toothed ring rotor as recited in claim 1, wherein the inclination of the tooth faces is at least 7°.

3. The cold-forged toothed ring rotor as recited in claim 1, wherein the inclination of the tooth faces is at least 8° and no more than 14°.

4. The cold-forged toothed ring rotor as recited in claim 1, wherein the radial height of each tooth is at least 1 mm and no more than 3 mm.

5. The cold-forged toothed ring rotor as recited in claim 4, wherein the radial height of each tooth is at least 2 mm.

6. The cold-forged toothed ring rotor as recited in claim 1, wherein the circumferential thickness of each tooth is at least 1 mm and no more than 2 mm.

7. The cold-forged toothed ring rotor as recited in claim 6, wherein the circumferential thickness of each tooth is no more than 1.5 mm.

8. The cold-forged toothed ring rotor as recited in claim 1, wherein the pitch angle between neighboring teeth is at least 2° and no more than 4°.

9. A cold-forged toothed ring rotor for detecting the revolving speed of a wheel in an automobile, the rotor comprising:

a ring body having inner and outer peripheral surfaces;

a plurality of circumferentially spaced teeth protruding radially from the outer peripheral surface of the ring body, the teeth being integrally formed with the ring body by the use of a cold forging process, and each of the teeth having a base integral with the ring body, circumferentially opposed tooth faces and a crest opposed to the base; and wherein each tooth is profiled to have a substantially trapezoidal shape in which the angular inclination of the tooth faces with respect to a radius of the ring body extending through the center of the tooth is at least 5° and no more than 15°.

10. A cold-forged toothed ring rotor for use with an electromagnetic induction sensor which detects teeth of the rotor during rotation of the rotor to thereby generate pulses indicative of the rotational speed of the rotor, the rotor comprising:

a ring body having inner and outer peripheral surfaces;

a plurality of circumferentially spaced teeth protruding radially from the outer peripheral surface of the ring body, the teeth being integrally formed with the ring body by the use of a cold forging process, and each of the teeth having a base integral with the ring body, circumferentially opposed tooth faces and a crest opposed to the base; and wherein each tooth is profiled to have a substantially trapezoidal shape in which the angular inclination of the tooth faces with respect to a radius of the ring body extending through the center of the tooth is at least 5° and no more than 15°.

11. A cold-forged toothed ring rotor for developing rotational speed signals, the rotor comprising:

a ring body having inner and outer peripheral surfaces;

a plurality of circumferentially spaced teeth protruding radially from the inner peripheral surface of the ring body, the teeth being integrally formed with the ring body by the use of a cold forging process, and each of the teeth having a base integral with the ring body, circumferentially opposed tooth faces and a crest opposed to the base; and wherein each tooth is profiled to have a substantially trapezoidal shape in which the angular inclination of the tooth faces with respect to a radius of the ring body extending through the center of the tooth is at least 5° and no more than 15°.

12. The cold-forged toothed ring rotor as recited in claim 11, wherein the inclination of the tooth faces is at least 7°.

13. The cold-forged toothed ring rotor as recited in claim 11, wherein the inclination of the tooth faces is at least 8° and no more than 14°.

14. The cold-forged toothed ring rotor as recited in claim 11, wherein the radial height of each tooth is at least 1 mm and no more than 3 mm.

15. The cold-forged toothed ring rotor as recited in claim 14, wherein the radial height of each tooth is at least 2 mm.

16. The cold-forged toothed ring rotor as recited in claim 11, wherein the circumferential thickness of each tooth is at least 1 mm and no more than 2 mm.

17. The cold-forged toothed ring rotor as recited in claim 16, wherein the circumferential thickness of each tooth is no more than 1.5 mm.

18. The cold-forged toothed ring rotor as recited in claim 11, wherein the pitch angle between neighboring teeth is at least 2° and no more than 4°.

19. A cold-forged toothed ring rotor for detecting the revolving speed of a wheel in an automobile, the rotor comprising:

a ring body having inner and outer peripheral surfaces;

a plurality of circumferentially spaced teeth protruding radially from the inner peripheral surface of the ring body, the teeth being integrally formed with the ring body by the use of a cold forging process, and each of the teeth having a base integral with the ring body, circumferentially opposed tooth faces and a crest opposed to the base; and wherein each tooth is profiled to have a substantially trapezoidal shape in which the angular inclination of the tooth faces with respect to a radius of the ring body extending through the center of the tooth is at least 5° and no more than 15°.

20. A cold-forged toothed ring rotor for use with an electromagnetic induction sensor which detects teeth of the rotor during rotation of the rotor to thereby generate pulses indicative of the rotational speed of the rotor, the rotor comprising:

a ring body having inner and outer peripheral surfaces;

a plurality of circumferentially spaced teeth protruding radially from the inner peripheral surface of the ring body, the teeth being integrally formed with the ring body by the use of a cold forging process, and each of the teeth having a base integral with the ring body, circumferentially opposed tooth faces and a crest opposed to the base; and wherein each tooth is profiled to have a substantially trapezoidal shape in which the angular inclination of the tooth faces with respect to a radius of the ring body extending through the center of the tooth is at least 5° and no more than 15°.

* * * * *